(12) United States Patent
Achtari et al.

(10) Patent No.: US 8,577,369 B2
(45) Date of Patent: Nov. 5, 2013

(54) SEAMLESS AND VERTICAL CALL HANDOFF SOLUTION ARCHITECTURE

(75) Inventors: Guyves Achtari, Ottawa (CA); Eric Bernier, Ottawa (CA); Kent Felske, Kanata (CA)

(73) Assignee: Apple, Inc., Cupertino, CA (US)

( * ) Notice: Subject to any disclaimer, the term of this patent is extended or adjusted under 35 U.S.C. 154(b) by 873 days.

(21) Appl. No.: 11/761,583

(22) Filed: Jun. 12, 2007

(65) Prior Publication Data

US 2008/0254797 A1   Oct. 16, 2008

Related U.S. Application Data

(60) Provisional application No. 60/911,146, filed on Apr. 11, 2007.

(51) Int. Cl.
*H04W 36/00* (2009.01)
*H04W 4/00* (2009.01)

(52) U.S. Cl.
USPC ........... 455/436; 455/438; 455/439; 455/442; 370/331

(58) Field of Classification Search
USPC ................... 455/436–444, 434, 435.1–435.3, 455/418–422.1, 426.1, 426.2, 432.1–449, 455/456.5, 464, 11.1, 13.1, 41.2, 550.1, 455/552.1, 553.1, 556.1, 556.2, 557, 560, 455/561; 371/331; 370/310.2, 328, 338, 370/331–333, 315, 351–356
See application file for complete search history.

(56) References Cited

U.S. PATENT DOCUMENTS

| | | | |
|---|---|---|---|
| 6,038,444 A * | 3/2000 | Schipper et al. | 455/421 |
| 7,403,794 B2 * | 7/2008 | Tsuchiuchi et al. | 455/552.1 |
| 2004/0170122 A1* | 9/2004 | Guo et al. | 370/210 |
| 2006/0258358 A1* | 11/2006 | Kallio | 455/437 |
| 2006/0270447 A1* | 11/2006 | Everson et al. | 455/552.1 |
| 2007/0026866 A1* | 2/2007 | Krishnamurthi et al. | 455/440 |

* cited by examiner

*Primary Examiner* — San Htun
(74) *Attorney, Agent, or Firm* — Meyertons, Hood, Kivlin, Kowert & Goetzel, P.C.; Eric B. Meyertons

(57) ABSTRACT

A system, method and apparatus for facilitating handoff of communications with a user device between a first communication network having a first domain technology, and a second communication network having a second domain technology different from the first domain technology, the system, method and apparatus includes an anchor point that establishes a first service flow with the first communication network, and a second service flow with the second communication network based upon a triggering event respectively, with the user device, and a handoff device that receives at least one handoff parameter for determining a handoff operation of the user device from the first communication network to the second communication network.

13 Claims, 6 Drawing Sheets

SEAMLESS AND VERTICAL CALL HANDOFF SOLUTION ARCHITECTURE

CROSS-REFERENCE TO RELATED APPLICATION

This application is related to and claims priority to U.S. Provisional Application Ser. No. 60/911,146, filed Apr. 11, 2007, entitled SEAMLESS CALL HANDOFF STATE MACHINE, the entirety of which is incorporated herein by reference.

STATEMENT REGARDING FEDERALLY SPONSORED RESEARCH OR DEVELOPMENT n/a

FIELD OF THE INVENTION

The present invention relates to communication networks, and more particularly to a method, system and apparatus that provides for control of call session handoffs across heterogeneous communication networks

BACKGROUND OF THE INVENTION

Wireless technologies are evolving toward broadband information access across multiple networking platforms as part of the demand for continuous availability of multimedia applications. Recent trends indicate that wide-area cellular networks based on second, third and fourth generation ("2G", "3G" and "4G") standards and wireless local area networks ("WLANs") will co-exist to offer multimedia services to end users. A converged system can provide both universal coverage and broadband access by the strategic combination of these technologies. Therefore, the integration of heterogeneous networks is expected to become a main focus in the development toward the next generation wireless networks.

Mobility management is a main challenge in the converged network. Both intra-technology handoff and inter-technology handoff take place. Intra-technology handoff is the traditional horizontal handoff ("HHO") process in which the mobile terminal ("MT") hands-off between two access points ("AP") or base stations ("BS") using the same access technology. In contrast, inter-technology handoff, commonly referred to as vertical handoff ("VHO") occurs when the mobile terminal roams between different access technologies. HHO is a symmetric process, while VHO is typically an asymmetric process in which the mobile terminal moves between two different networks with different characteristics based on network policies. This introduces the concept of a preferred network, which is usually the WLAN that provides better throughput performance at lower cost, even if both networks are available and in good condition for the user.

There are two main scenarios in VHO: moving out of the preferred network ("MOUT") and moving into the preferred network ("MIN"). For example, the current handoff function control is processed by the MT based on local measurement of signal strengths from the primary network, e.g., wireless fidelity ("WiFi"), and the secondary network, e.g., cellular. In this scenario, the secondary, e.g., cellular network to primary, e.g., WiFi network, handoff occurs when a new WiFi access point ("AP") is detected and the AP signal strength is greater than a pre-selected high threshold parameter. On the other hand, a primary (e.g., WiFi) to a secondary (e.g., cellular) handoff occurs when the WiFi signal strength becomes less than a pre-selected low threshold parameter. These two handoffs rely on the received signal strength ("RSS") as an indicator for service availability from a certain point of attachment, as well as for comparison between the current point of attachment and the candidate points of attachment. Presently, the use of poorly configured hysteresis thresholds by the mobile station or MT will typically result in poor handoff timing such as early handoff, late handoff or multiple handoffs.

On the one hand, late handoff decisions by the MT result in loss of basic connectivity, referred to as a "black hole" problem, when there is insufficient time for the completion of handoff operations, e.g., dynamic host configuration protocol ("DHCP"), mobile IP ("MIP") signaling, network acquisition and authentication, and other control signaling, or there is a lack of coverage overlap between two networks. On the other hand, early handoff decisions may produce a "ping pong" effect, which is where the MT is unnecessarily switching between the heterogeneous networks, e.g., between WLAN and cellular networks, and is characterized by excessive rates of handoffs, poor quality of service ("QoS") for real-time flows, and excessive signaling load on network servers. The "ping pong" effect is rather pronounced in the urban environment where municipalities, enterprise and residential customers have massively deployed WLANs or wireless mesh networks and intend to use them as low-cost alternative to cellular systems, even for delay-sensitive traffic including voice.

What is desired is an arrangement under which vertical handoff from one communications network to another communications network is controlled to avoid the "black hole" and "ping pong" effects.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In accordance with an aspect, the present invention provides a system for facilitating handoff of communications with a user device between a first communication network having a first domain technology, and a second communication network having a second domain technology different from the first domain technology, the system includes an anchor point that establishes a first service flow with the first communication network, and a second service flow with the second communication network based upon a triggering event respectively, with the user device, and a handoff device that receives at least one handoff parameter for determining a handoff operation of the user device from the first communication network to the second communication network.

In accordance with another aspect, the present invention provides a method for facilitating handoff of communications with a user device between a first communication network having a first domain technology, and a second communication network having a second domain technology different from the first domain technology, the method including detecting at least one triggering event corresponding to a service flow in the first communication network, evaluating the at least one triggering event with a handoff device to establish a pre-handoff operation, receiving at least one handoff parameter corresponding to the service flow in the first communication network and establishing a handoff decision.

In accordance with another aspect, the present invention provides an anchor point for facilitating handoff of communications with a user device between a first communication network having a first domain technology, and a second communication network having a second domain technology different from the first domain technology, the anchor point including a memory for storing data corresponding to at least one triggering event, and a processor that operates to obtain at least one triggering event corresponding to a service flow in the first communication network, to receive at least one handoff parameter for determining a handoff operation of user device communications from the first communication network to the second communication network to evaluate the at least one handoff parameter with a handoff device to establish a handoff decision.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
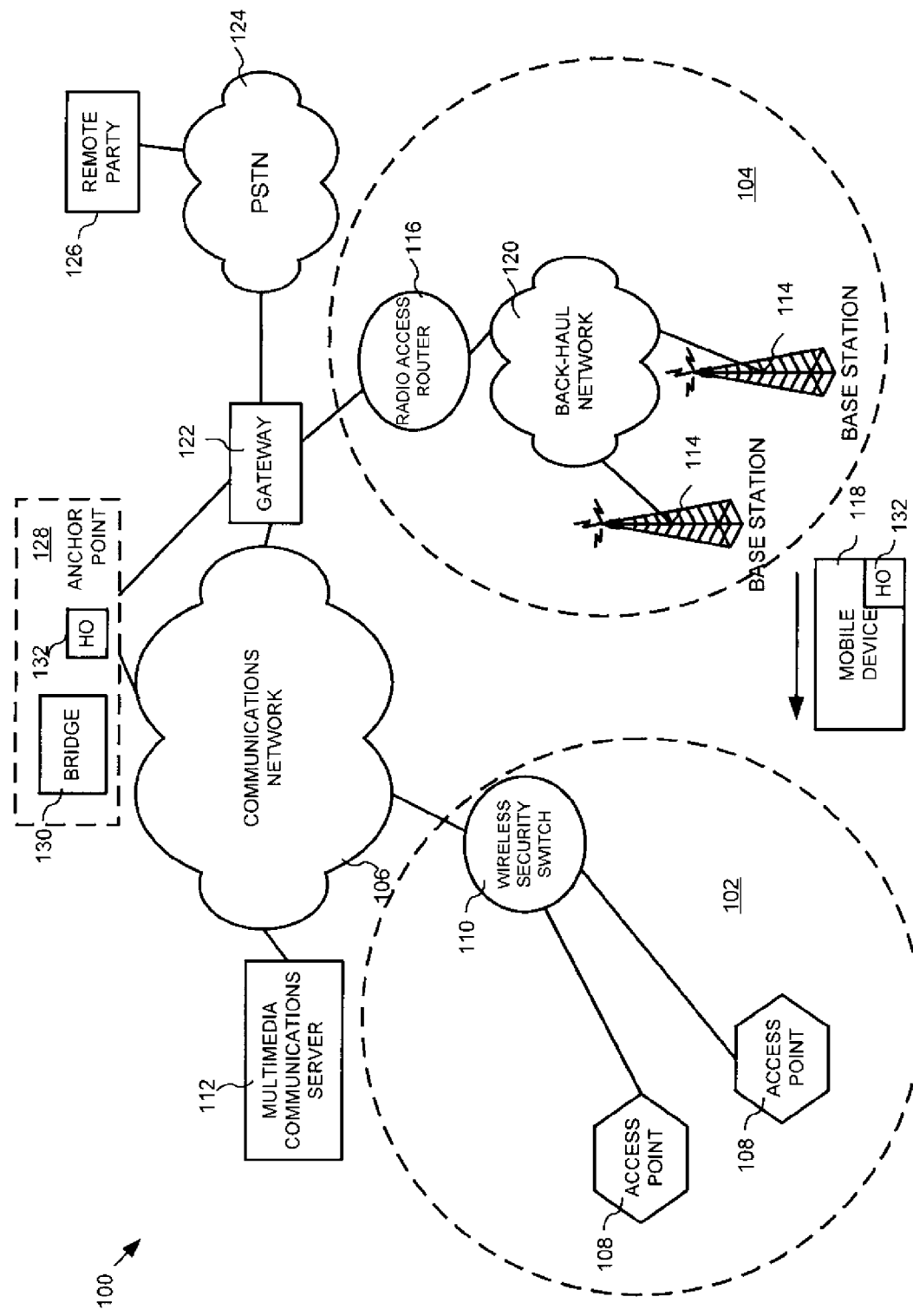
FIG. 1 is a block diagram of the network architecture of an interworking heterogeneous wireless access network constructed in accordance with the principles of the present invention.

Referring now to the drawing figures in which like reference designators refer to like elements, there is shown in FIG. 1, a block diagram of the network architecture of an interworking heterogeneous wireless access system constructed in accordance with the principles of the present invention and designated generally as "100". The system 100 includes a first network 102 having a first domain technology, e.g., a WiFi network, a second network 104 having a second domain technology, e.g., a cellular network, and a communications network 106. It should be noted that although the invention is described with reference to the WiFi protocol and "access points", the invention may easily be adapted by one of skill in the art to provide identification information to ease the transition between any two networks, including WiFi, WiMAX and others known in the art or later developed. The WiFi network 102 includes access point ("AP") nodes 108 which are two-way transceivers that broadcast data into the surrounding environment and typically act as mediators between wired and wireless networks. The AP nodes 108 typically operate in the unlicensed Institute of Electrical and Electronics Engineers ("IEEE") standard 802.11 spectrum bands of 2.4 GHz and 5 GHz. Each AP node 108 broadcasts its service set identifier ("SSID", network name) via packets that are called beacons, which by default broadcast every 100 ms according to IEEE 802.11 protocol. Based on the settings (e.g., the SSID), the client device may select an AP for association.

Figure 2:
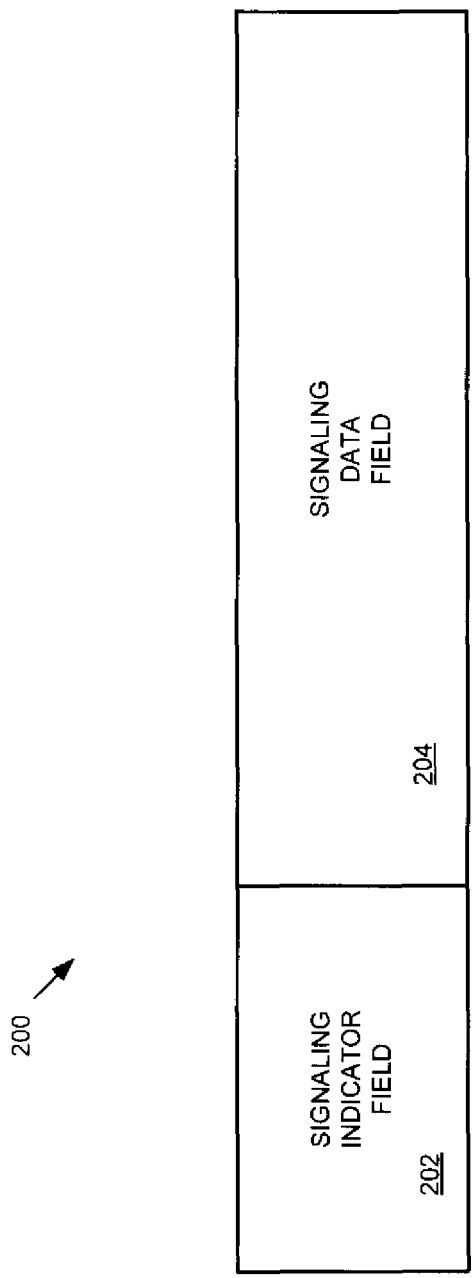
FIG. 2 is a block diagram of a signaling service set identifier ("SSID") constructed in accordance with the principles of the present invention.

A conventional SSID is a sequence of up to 32 letters or numbers defining the ID, or name, of a wireless local area network. This SSID is set by a network administrator. For open wireless networks, the SSID is broadcasted to all wireless devices within range of the network access point. As shown in FIG. 2, this conventional SSID can be modified to create a specialized SSID 200, referred to hereinafter as "signaling SSID", on the beaconing channel at the beaconing intervals. The signaling SSIDs provide advance warning to the client devices of impending changes in the network landscape, such as movement between wireless LANs 108 or the presence of a cellular network base station 114.

FIG. 2 illustrates exemplary fields that can be included in the signaling SSID 200. In this embodiment, the conventional SSID is modified by allocating at least a portion of the SSID bits to a signaling indicator field 202 with the reminder of the SSID bits being used for signaling data 204. The signaling indicator 202 is a field arranged to alert a client application that the SSID beacon does not correspond to a network name, but rather the message includes network configuration information that may be of use to the application when making network decisions. In one embodiment, a signaling SSID called "Temp SSID" is used as a triggering mechanism for a mobile user device 118 to commence a pre-handoff action prior to an anticipated handoff transition occurring.

Referring again to FIG. 1, WiFi network 102 can include a nonsecure distribution network (not shown) for connecting the AP nodes 108 to a wireless security switch ("WSS") 110. The WSS 110 functions to provide secure access to communications network 106 from the WiFi network 102 (e.g., AP nodes 108), mobility management, and configuration management of the AP nodes 108. Multimedia Communication Server ("MCS") 112 is a network based, session initiation protocol ("SIP") application delivery solution that seamlessly integrates IP Telephony, multimedia conferencing, instant messaging ("IM"), presence and other collaboration tools for users and may optionally provide authentication, authorization and accounting ("AAA") services in Wi-Fi network 102.

Cellular network 104 includes at least one base transceiver station ("BS") 114 which contains equipment for the transmission and reception of radio signals (i.e., transceivers), antennae, and equipment for encrypting and decrypting communications with a base station controller such as radio access router ("RAR") 116. BS 114 includes the hardware and software used to implement the functions described herein to support the MAC control plane functions. BS 114 includes a central processing unit, transmitter, receiver, I/O devices and storage such as volatile and nonvolatile memory as may be needed to implement the functions described herein. BS 114 provides communications with the mobile user device 118 (e.g., a dual mode handset telephone) over the radio interface. A back-haul network 120 provides transportation of traffic between the BS 114 and the RAR 116. The RAR 116 controls the BS 114 and performs various control functions such as load control, admission control, packet scheduling, handover/handoff control, macrodiversity combining, security functions, mobility management, and the like.

Cellular network 104 further includes media gateway ("MGW") 122 which interconnects networks with different network protocol technologies by performing the required protocol conversions. For example, media gateway 122 converts the PSTN time division multiplexing ("TDM") voice bit stream to an IP real-time transport protocol ("RTP") for use by the communications network 106. Of course media gateway 122 also converts the IP RTP packets to the voice bit stream for the PSTN 124. In addition, media gateway 122 can convert packet data services domain of back-haul network 120, e.g., where the network is a code division multiple access ("CDMA") or cdma2000 technology. The MGW 122 may include mobile Internet protocol ("MIP") foreign agent ("FA") functionality for MIP version 4 ("MIPv4") and MIP version 6 ("MIPv6") access. MIP is an Internet Engineering Task Force ("IETF") standard communications protocol that is designed to allow mobile user device 118 to move from one network to another while maintaining its permanent IP address.

MGW 122 may also provide allocation of an IP address to the mobile user device 118 from the operator's network, e.g., the cdma2000 network, and provide for the encapsulation and de-capsulation of traffic to and from the mobile user device 118, as well as enforcing the operator's policies such as packet filtering and routing. For example, the operator's policies may provide for different restrictions on network access based on certain times or days, or on whether the employee is a member of management. In addition, the MGW 122 may also support user (e.g., mobile user device 118) authentication and transfer of authorization policy though the interface to a home AAA ("H-AAA").

Communications network 106 can further include an anchor point 128 that resides on network 100 and is used in a "make before break" communication handoff process. Anchor point 128 can include a bridge 130 and an agent function (FIGS. 3 and 4), which operates to control all incoming and outgoing calls or service flows to/from a user client, e.g., mobile user device 118. Anchor point 128 can include a central processing unit, transmitter, receiver, I/O devices and storage such as volatile and nonvolatile memory as may be needed to implement the functions described herein. Anchor point 128 can also include a stream splicing function such as bridge 130. For example, when a mobile user device 118 is in transition between two networks 102 and 104, the mobile user device 118 will maintain two active calls in conjunction with the anchor point 128. This advantageously provides the mobile user device 118 with the assurance that a smooth and seamless handover/handoff will occur as the mobile user device 118 transitions from one network to the next. A further discussion of call flow and transition domain will be discussed with respect FIGS. 3, 4 and 5.

The mobile user device 118 may include a wide range of portable electronic devices, including but not limited to mobile phones, personal data assistants ("PDA") and similar devices, which use the various communication technologies such as advanced mobile phone system ("AMPS"), time division multiple access ("TDMA"), code division multiple access ("CDMA"), global system for mobile communications ("GSM"), general packet radio service ("GPRS"), 1× evolution-data optimized (abbreviated as "EV-DO" or "1xEV-DO") and universal mobile telecommunications system ("UMTS"). Mobile user device 118 also includes the hardware and software suitable to support the MAC control plane functions needed to engage in wireless communication with base station 114 and access points 108. Such hardware can include a receiver, transmitter, central processing unit, storage in the form of volatile and nonvolatile memory, input/output devices, etc.

Figure 3:
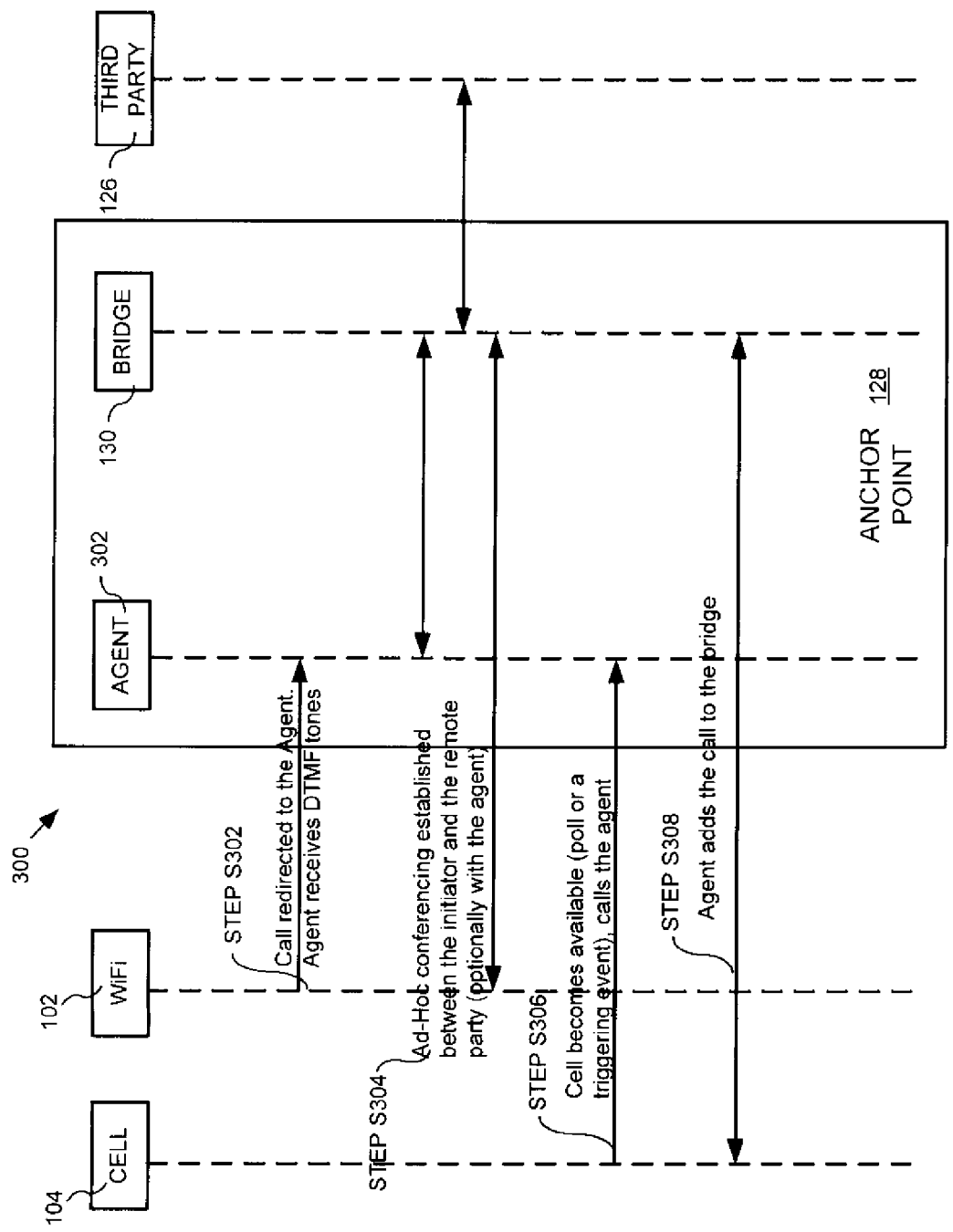
FIG. 3 is a flow diagram of a service flow initiated from a WiFi network in accordance with the principles of the present invention.

A typical call flow 300 from a WiFi network 102 to a cellular network 104 is discussed with reference to FIG. 3. At step S302, the mobile user device 118 attempts to make a call using the WiFi network 102. Instead of being directly connected to the remote party 126, the call is redirected to an agent 302 via an anchor point 128, where the agent 302 receives the DTMF tones representing a remote party's address. At step S304, the agent 302 uses bridge 130 to establish ad-hoc conferencing between the initiator, e.g., mobile user device 118 and the remote party 126 (and optionally the agent 302). Once the cellular network 104 becomes available (via poll or via a triggering event such as a signaling SSID or a location change event) it calls the agent 302 (step S306). At step S308, agent 302 now adds the cellular call to bridge 130 and provides a seamless handover/handoff from WiFi network 102 to a cellular network 104.

Figure 4:
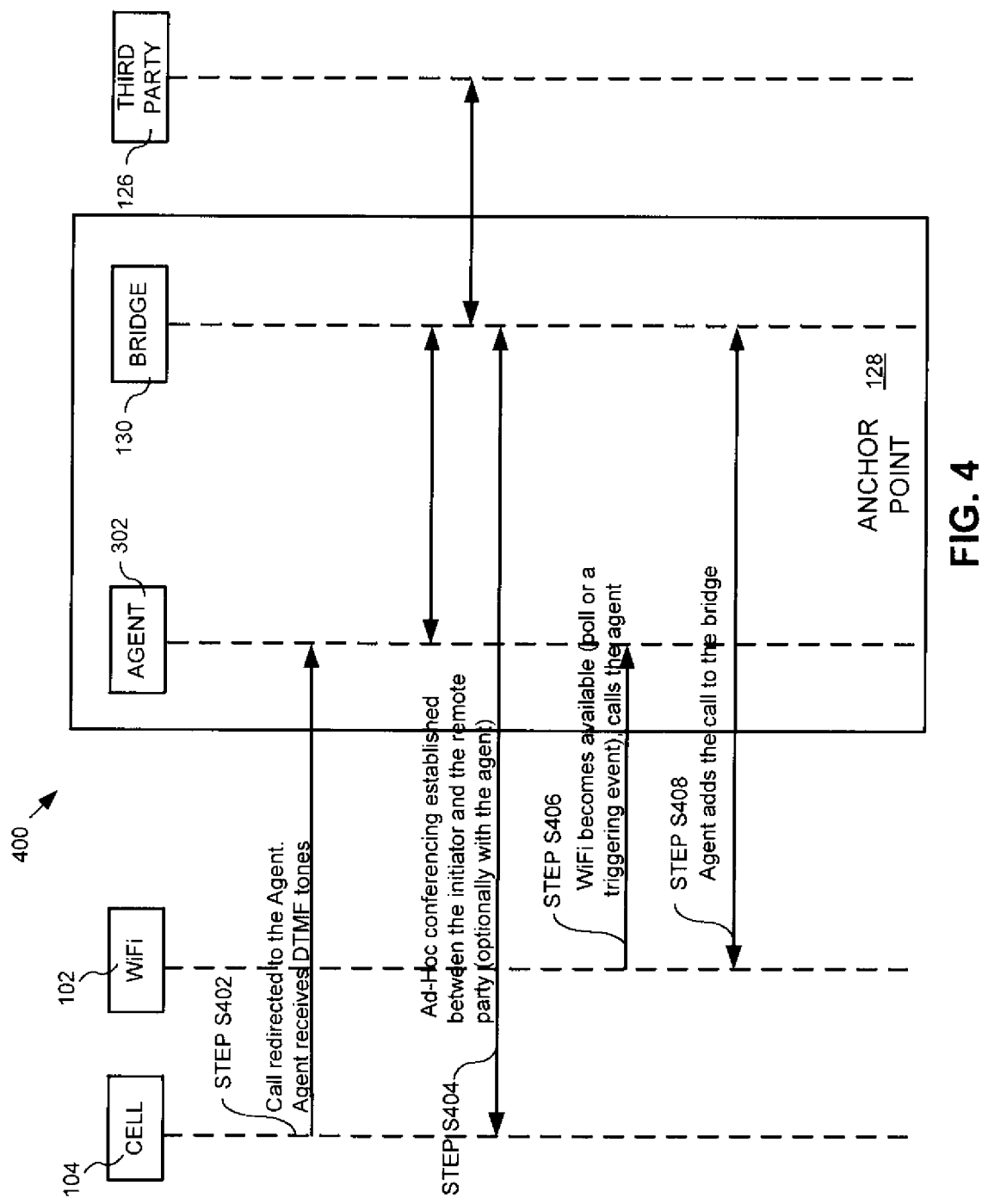
FIG. 4 is a flow diagram of a service flow initiated from a cellular network in accordance with the principles of the present invention.

A typical call flow from a cellular network 104 to a WiFi network 102 is now discussed with reference to FIG. 4. At step S402, the mobile user device 118 attempts to make a call using the cellular network 104. Instead of being directly connected to the remote party 126, the call is redirected to an agent 302 via an anchor point 128, where the agent 302 receives the DTMF tones. At step S404, the agent 302 uses bridge 130 to establish ad-hoc conferencing between the initiator, e.g., mobile user device 118, and the remote party 126 (and optionally the agent 302). Once the WiFi network 102 becomes available (via poll or via a triggering event such as a signaling SSID or a location change event) it calls the agent (step S406). At step S408, agent 302 now adds the WiFi call to bridge 130 and provides a seamless handover/handoff from cellular network 104 to WiFi network 102.

Figure 5:
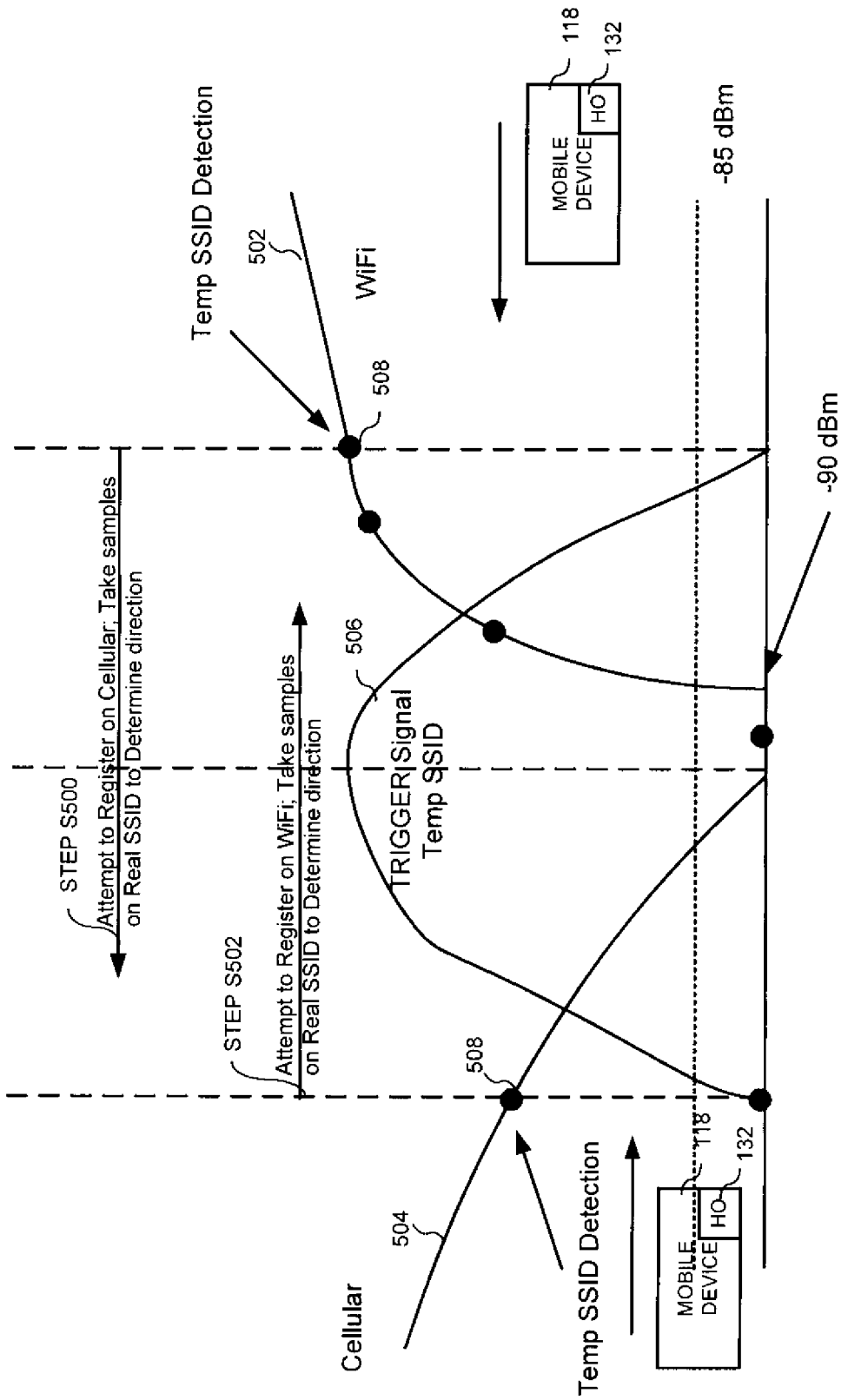
FIG. 5 is a flow diagram illustrating a handoff transition domain in accordance with the principles of the present invention.

A transition domain in heterogeneous system 100 is now discussed with reference to FIG. 5. The graph illustrates a WiFi signal strength curve 502, a cellular signal strength curve 504 and a trigger signal curve 506. FIG. 5 illustrates that a mobile user device 118 has a session connection in the WiFi network 102 on the right side of the graph. As the mobile user device 118 advances right to left, the mobile user device 118 will detect triggering event, such as a signaling SSID called Temp SSID that indicates that the mobile user device 118 is approaching a WiFi network boundary. Upon receipt of the Temp SSID, a handoff mechanism module 132, which can be a two stage decision engine, residing on the mobile user device 118 or in the network 100 can commence the decision process of whether a handoff will be necessary.

In a two stage decision engine handoff mechanism, the first stage is a "pre-handoff" stage and the second stage is a "handoff" stage. In this embodiment, the pre-handoff stage is dependent on the triggering event, such as a Temp SSID trigger, a location trigger, a signal strength trigger, a user preference trigger, etc., and the existence of a set of conditions on the network 100 to initiate the pre-handoff stage. The pre-handoff combines all appropriate operations to affect a seamless handoff. For example, the pre-handoff accounts for, but is not limited to, registering with the foreign network, anchoring the call from a second interface with the anchor point, monitoring and recording parameters used for a handoff. In this embodiment, the handoff stage is dependent on one or more handoff parameters or conditions. For example, handoff can rely on traditional parameters such as power levels and received signal strength indication, or other parameters such as security parameters, location, emergency mode parameters, etc.

The handoff decision mechanism 132 of the present invention advantageously combines a set of techniques used to make accurate transition decisions with enhancements for seamless and transparent service switching in the mobile user device 118 and the network 100. In certain circumstances, conditions for a handoff may remain present after handoff execution in the transition area. In these circumstances, a mobile user device 118 would be subject to the "ping-pong"

effect, as multiple handoffs can be initiated and executed. In order to avoid the "ping-pong" effect, the handoff mechanism 132 can ensure that the direction of the movement of mobile user device 118 is consistent with the source/destination network locations. This condition called the "direction detection" algorithm is used as a condition for any handoff decision and it assists in avoiding loops in the transition state machines that may cause the "ping-pong" effect. Additional techniques such as averaging, dwell-timer and hysteresis, known to improve the accuracy of handoff decision, are used in combination with the proposed solution.

Figure 6:
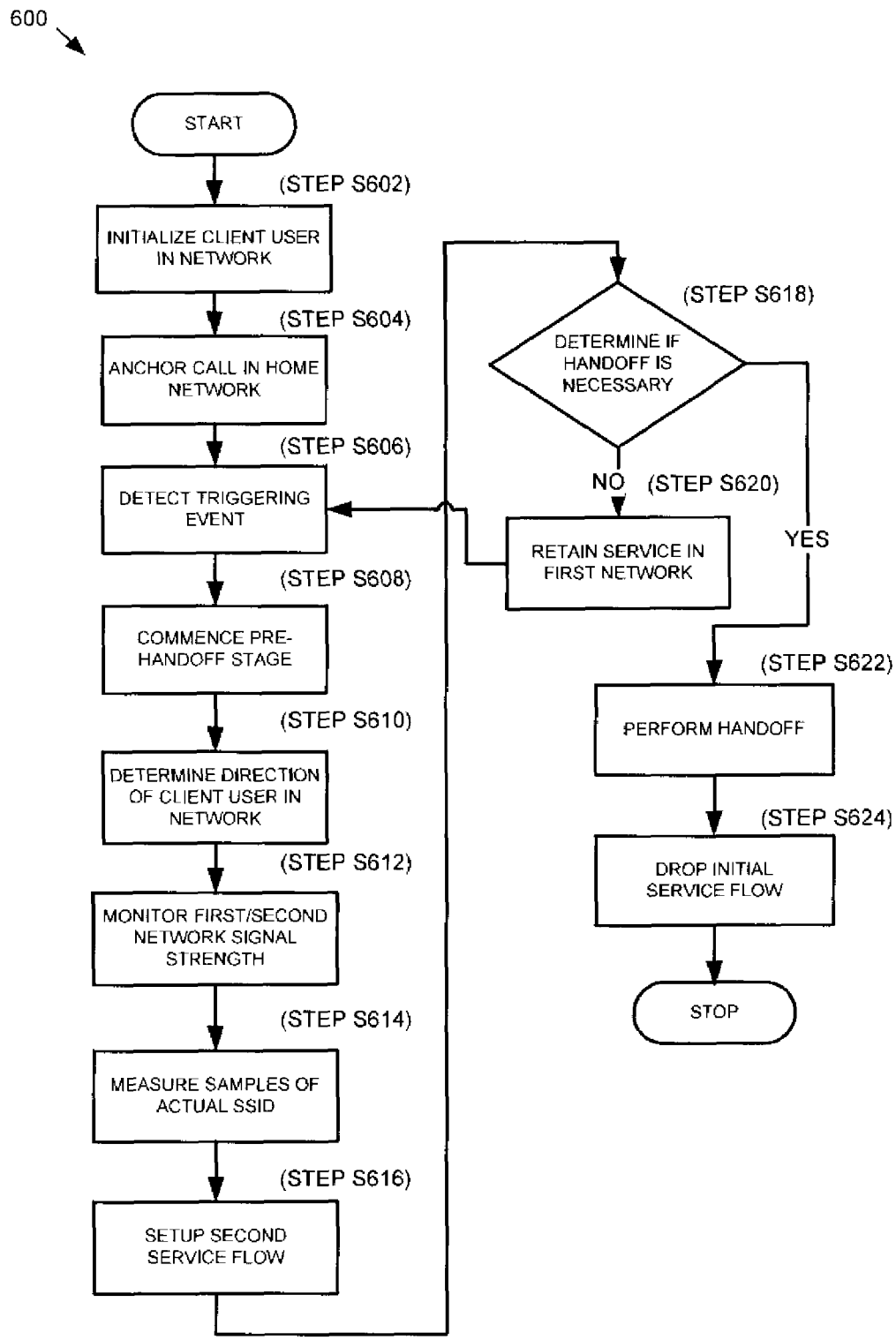
FIG. 6 is a flow diagram illustrating a handoff process in accordance with the principles of the present invention.

FIG. 6 is a flow diagram illustrating a handoff management process 600 for facilitating handoffs in system 100. At step S602, a mobile user device 118 is initialized and registered in network 100. In this example, it is assumed that the mobile user device 118 is registered in WiFi network 102 and active on a service call that the call is "anchored" in the home network (step S604). The mobile user device 118 detects a triggering event such as a signaling SSID called "Temp SSID", which contains some network configuration information such as an indication that the mobile user device 118 is approaching a network boundary (step S606). At step S608, the pre-handoff stage, which combines all appropriate operations to affect a seamless handoff commences. For example, the pre-handoff accounts for, but is not limited to, registering with the foreign network, anchoring the call from a second interface with the anchor point, monitoring and recording parameters used for a handoff. For example, the mobile user device 118 can scan for services on another network and register with that potential destination domain. At step S610, the direction of the mobile user device 118 is determined, which can be used as decision criteria on whether another handoff should be initiated or not, at that particular time frame or another time frame. One way to determine the direction that a mobile user is traveling by calculating the power difference between two conventional SSID signals. As mobile user device 118 moves away from the access points of WiFi network 102, the received signal strength will diminish. The mobile user device 118 can also monitor network strength of the first and second networks at step S612. In step S614, the mobile user device 118 can further measure samples of actual SSIDs other than the special ones known as signaling SSIDs 300. If the second service flow has not been fully setup, the second service flow may be completed at step S616. If a determination that a handoff is not necessary, the mobile user device 118 can retain the service flow in the first network (step S620 and then return to step S606 to detect another triggering event. Otherwise, if the handoff mechanism 132 makes a determination that a handoff is necessary, the mobile user device 118 will handoff from the first network 102 to the second network 104 (step S622). Upon completion of the handoff from the first network 102 to the second network 104, the initial service flow in the first network terminates (step S624).

The present invention advantageously provides a system, method and apparatus for facilitating handoff of a mobile user device across inter-technology networks by employing a handoff mechanism using a triggering event, such as a signaling service set identifier ("SSID") trigger, a location trigger, a signal strength trigger, a user preference trigger, etc., that initiates a pre-handoff function to setup multiple active service calls on an anchor point. By employing this improved handoff scheme, the mobile end user will experience a seamless transition from one technology domain to another technology domain without interruption of a service session.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention. In addition, unless mention was made above to the contrary, it should be noted that all of the accompanying drawings are not to scale.

What is claimed is:

1. A system for facilitating handoff of communications with a user device between a first communication network having a first domain technology, and a second communication network having a second domain technology different from the first domain technology, the system comprising:
   an anchor point, the anchor point establishing a first service flow with the first communication network, and a second service flow with the second communication network, and the anchor point generating a triggering event indicating to the user device that the user device is approaching a network boundary, the anchor point facilitating the establishment of an ad-hoc conference call between the user device and a remote party prior to the handoff;
   a handoff device, the handoff device receiving at least one handoff parameter for determining a handoff operation of the user device from the first communication network to the second communication network, the handoff device operating in a pre-handoff stage for initiating the second service flow to an agent of the anchor point and communicating at least an address of the remote party during service establishment between the user device and the remote party; and wherein the triggering event is a temporary signaling service set identifier (SSID) signal including network configuration information; and
wherein a power profile of the temporary SSID signal overlaps a power profile associated with the first network and overlaps a power profile associated with the second network.

2. The system of claim 1, wherein the handoff device includes a handoff stage for executing the handoff operation of the user device from the first communication network to the second communication network.

3. The system of claim 1, wherein the anchor point includes the handoff device.

4. The system of claim 1, further comprising a direction detector, the direction detector determining the direction that the user device is traveling with respect to the first communication network and the second communication network.

5. The system of claim 1, further comprising a received signal strength indicator, the received signal strength indicator determining the signal strength received by the user device within the first communication network and the second communication network.

6. The method of claim 1, wherein the handoff device is configured to ensure that the direction of the movement of the user device is consistent with the source destination network location of the remote party.

7. A method for facilitating handoff of communications with a user device between a first communication network having a first domain technology, and a second communication network having a second domain technology different from the first domain technology, the method comprising:
generating a triggering event at an anchor point, the triggering event indicating to the user device that the user device is approaching a network boundary;
establishing, at the anchor point, a first service flow with the first communication network, and a second service flow with the second communication network in response to the triggering event;
during a pre-handoff stage:
facilitating the establishment, by the anchor point, of an ad-hoc conference call between the user device and a remote party;
initiating the second service flow to an agent of the anchor point;
communicating at least an address of the remote party during service establishment between the user device and the remote party;
establishing a handoff decision; and
wherein the triggering event is a temporary signaling service set identifier (SSID) signal including network configuration information; and
wherein a power profile of the temporary SSID signal overlaps a power profile associated with the first network and overlaps a power profile associated with the second network.

8. The method of claim 7, further comprising:
measuring signal strength samples of a conventional signaling service set identifier (SSID); and
determining a direction of the user device by comparing the measured signal strength samples.

9. The method of claim 7, further comprising scanning for service on another network.

10. An anchor point for facilitating handoff of communications with a user device between a first communication network having a first domain technology, and a second communication network having a second domain technology different from the first domain technology, the anchor point comprising:
a memory for storing network configuration data associated with at least one triggering event, the triggering event indicating to the user device that the user device is approaching a network boundary;
a processor, the processor operating to:
generate the at least one triggering event corresponding to a first service flow in the first communication network to commence a pre-handoff operation;
establish a first service flow with the first communication network, and a second service flow with the second communication network based upon the at least one triggering event;
receive at least one handoff parameter for determining a handoff operation of the user device from the first communication network to the second communication network;
during a pre-handoff stage:
facilitating the establishment of an ad-hoc conference call between the user device and a remote party;
initiate the second service flow to an agent of the anchor point;
communicate at least an address of the remote party during service establishment between the user device and the remote party;
evaluate the at least one handoff parameter with a handoff device to establish a handoff decision; and
wherein the triggering event is a temporary signaling service set identifier (SSID) signal including network configuration information; and
wherein a power profile of the temporary SSID signal overlaps a power profile associated with the first network and overlaps a power profile associated with the second network.

11. The anchor point of claim 10, wherein the processor further operates to measure signal strength samples of a conventional temporary signaling service set identifier (SSID) signal.

12. The anchor point of claim 11, wherein the processor further operates to determine a direction of the user device by comparing the measured signal strength samples.

13. The anchor point of claim 10, wherein the processor further operates to anchor multiple incoming and outgoing calls to a user device.

* * * * *

UNITED STATES PATENT AND TRADEMARK OFFICE
CERTIFICATE OF CORRECTION

| | |
|---|---|
| PATENT NO. | : 8,577,369 B2 |
| APPLICATION NO. | : 11/761583 |
| DATED | : November 5, 2013 |
| INVENTOR(S) | : Guyves Achtari et al. |

It is certified that error appears in the above-identified patent and that said Letters Patent is hereby corrected as shown below:

On the Title Page

Item (73) Assignee: Please delete "Apple, Inc." and substitute -- Apple Inc. --

Signed and Sealed this
Twenty-fourth Day of June, 2014

Michelle K. Lee
*Deputy Director of the United States Patent and Trademark Office*